March 11, 1969  J. B. PICKEL  3,431,624
STRIP INSPECTION SYSTEM
Filed Oct. 14, 1966  Sheet 5 of 7

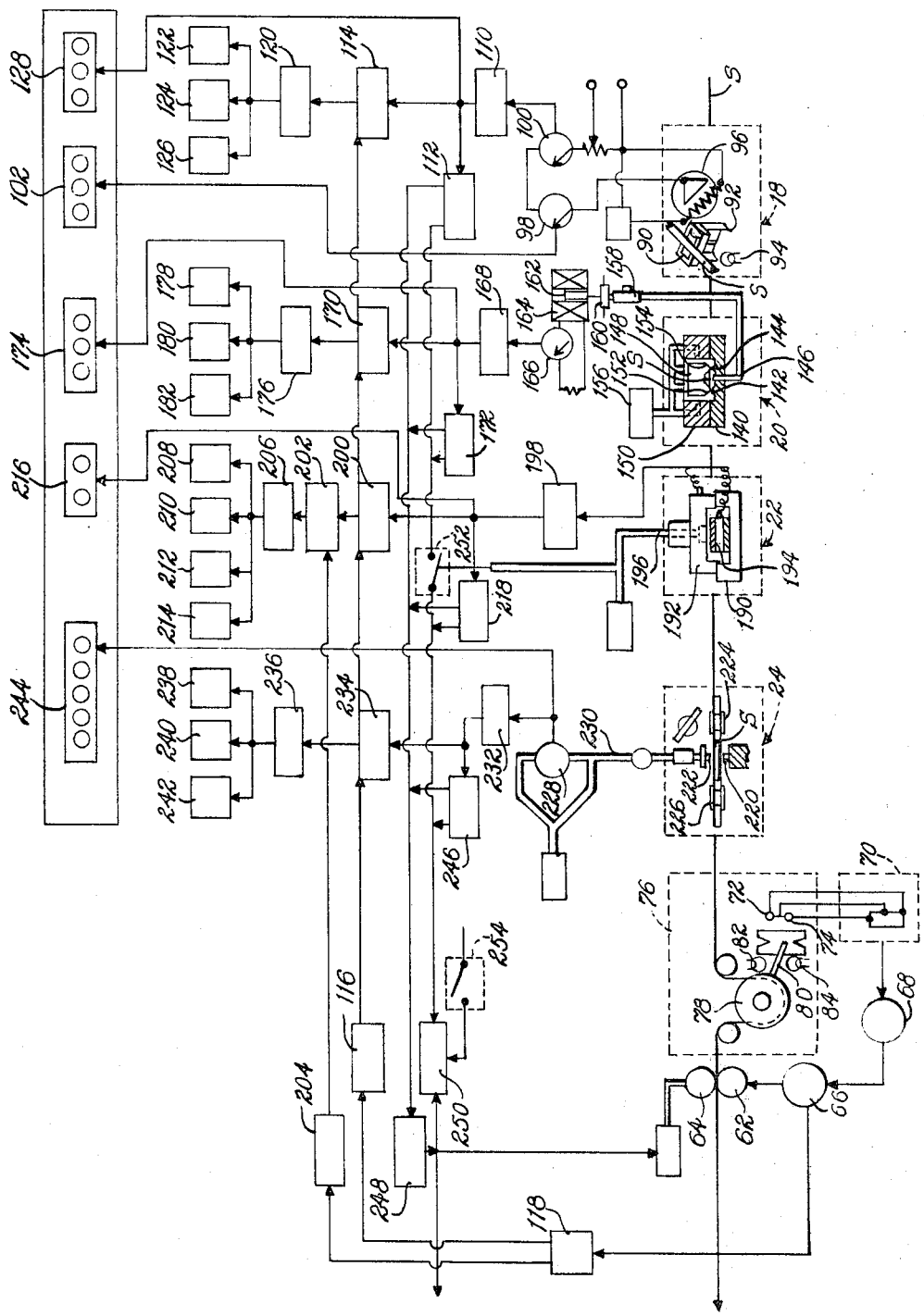

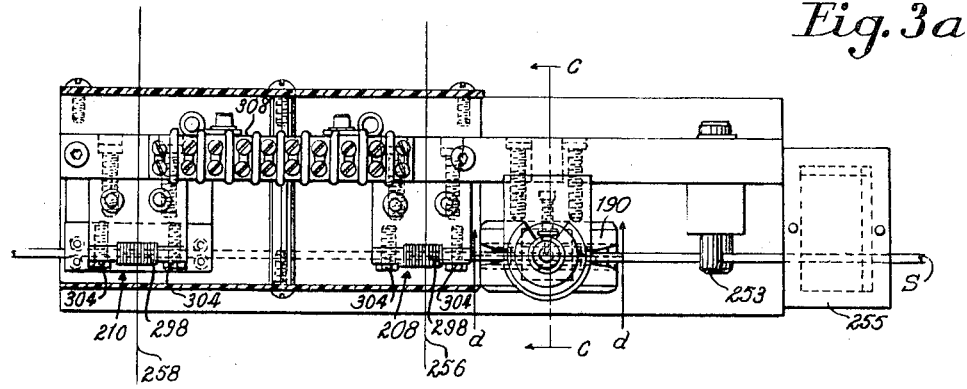
Fig. 3a
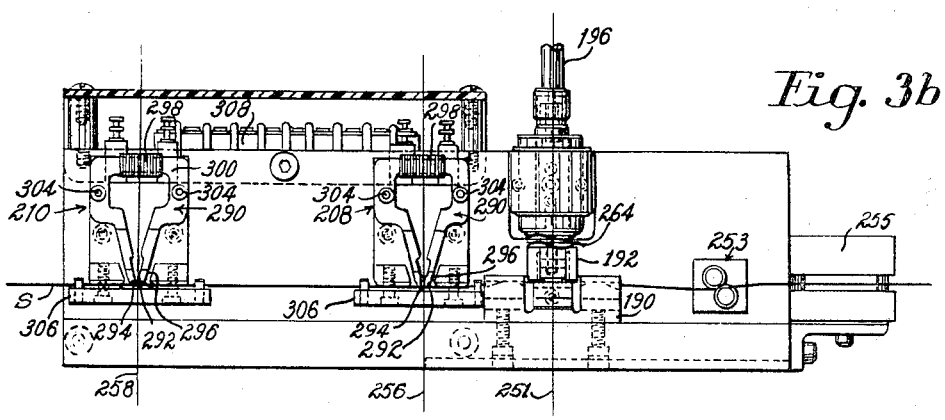
Fig. 3b
Fig. 3c
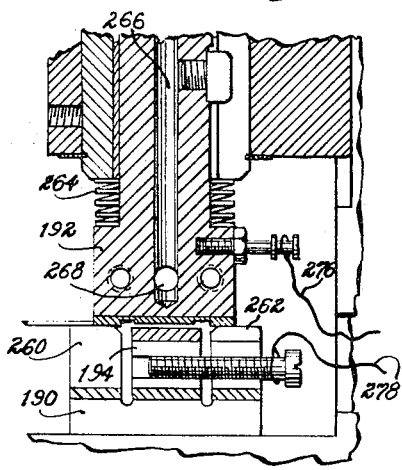
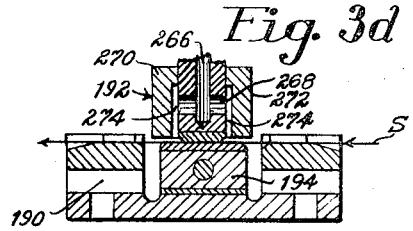
Fig. 3d

United States Patent Office 3,431,624
Patented Mar. 11, 1969

3,431,624
STRIP INSPECTION SYSTEM
James Brennan Pickel, Jamaica Plain, Mass., assignor to The Gillette Company, Boston, Mass., a corporation of Delaware
Filed Oct. 14, 1966, Ser. No. 586,843
U.S. Cl. 29—407     23 Claims
Int. Cl. B23q *17/00;* B23p *25/00*

ABSTRACT OF THE DISCLOSURE 0.0015 inch gauge strip steel stock for razor blades is slit to 0.19 inch width; subjected in sequence to a hardening temperature of 2000° F., a quenching temperature of −90° F. and a tempering temperature of 600° F.; inspected for sweep, dish, distortion and width characteristics; an edge of the strip is sharpened (the width of the blade and the quality of the edge being sensed during the sharpening operation); the sharpened edge of the blade is coated; and the strip is then separated into blade lengths. Detected defects are synchronously magnetically marked on the blade strip at the inspection stations and all blade lengths are sensed with a Hall effect device. Whenever a magnetic mark is detected, the blade length is discarded.

---

This invention relates to methods and apparatus for the control of processes of the continuous type, and particularly to process control apparatus of the type specifically useful in connection with the production, on a continuous basis, of metallic elements such as razor blades.

In a process system for the manufacture of razor blades, a metal strip is sequentially subjected to heat treatment in a hardening operation, mechanical working to sharpen one or both edges of the strip to a shaving edge, frequently further heat treatment in connection with the application of a shave facilitating coating to the sharpened edges of the blade, and finally separation of the processed strip into blade elements. Other operations such as placing identifying indicia on the metal strip may also be performed in such a processing system.

In the processing of such metallic strip, it is desirable to provide inspection at regular and frequent intervals of various parameters of the strip stock. Typically, control limits are established, a first (control of process) limit indicates deviation of the product from pre-established criteria and may be used to alert supervising personnel that the production system requires correction, and a second (control of product) limit indicates that the product should be rejected as outside of established quality control limits. Portions of the strip outside the product control limits should be removed prior to the final step, such as packaging. However, in a continuous production line, it is undesirable to stop the porcess to remove the random defective portions and it is preferred to remove those defective portions at a minimum of selected locations consistent with efficient processing criteria. Where a defective portion is not immediately removed, the strip must be marked in a manner that is compatible with the further processing with particular regard to such factors as the effect of the marking on further processing and/or on the final product, the retention of the marking during further processing, and the relative ease of detection of the marking. In connection with the production of articles such as razor blades, the final product must be held to extremely close tolerances, and the marking system should properly respond to input information from a variety of different gauging elements.

It is an object of this invention to provide novel and improved process control apparatus for use in the supervision in the production of metal articles in a continuous processing system.

Another object of the invention is to provide an improved control system particularly useful in the manufacture of razor blades.

Still another object of the invention is to provide a novel and improved magnetic marking system in which marks are placed on the metal article being processed in a manner not inconsistent with further processing and which permits accurate detection of the thus identified sections.

In accordance with the invention there is provided process control apparatus which includes a gauging station for sensing a parameter of a metal strip or similar element being continually produced and which produces a gauging output on the sensing of a predetermined value of the sensed parameter. The system further includes a signal source coordinated with the movement of the metal material past the gauging station which produces gating signals at regular intervals. A magnetic marking head is positioned adjacent the path of the metal material and a control responsive to the gauging station output and the gating signal energizes the marking head to apply a mark to the metal material in response to the concurrent generation of the gauging and gating output signals. The marked material is further porcessed on a continuous basis and at appropriate locations the marks are sensed and appropriate action taken in response to the detected marks.

Other objects, features, and advantages of the invention will be seen as the following description of a particular embodiment thereof progresses, in conjunction with the drawings, in which:

FIG. 2 is a block diagram showing details of process control instrumentation associated with the strip hardening portion of the processing system;

Figure 4A:
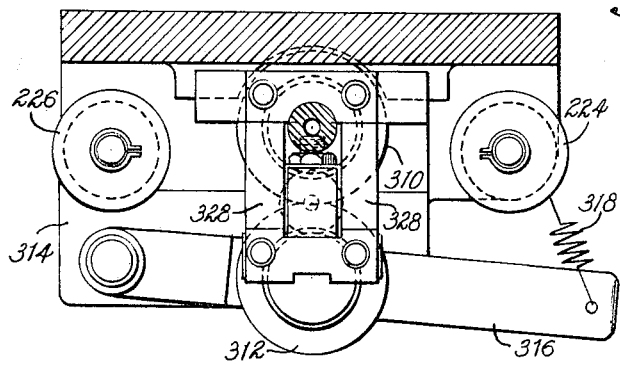
Figure 4B:
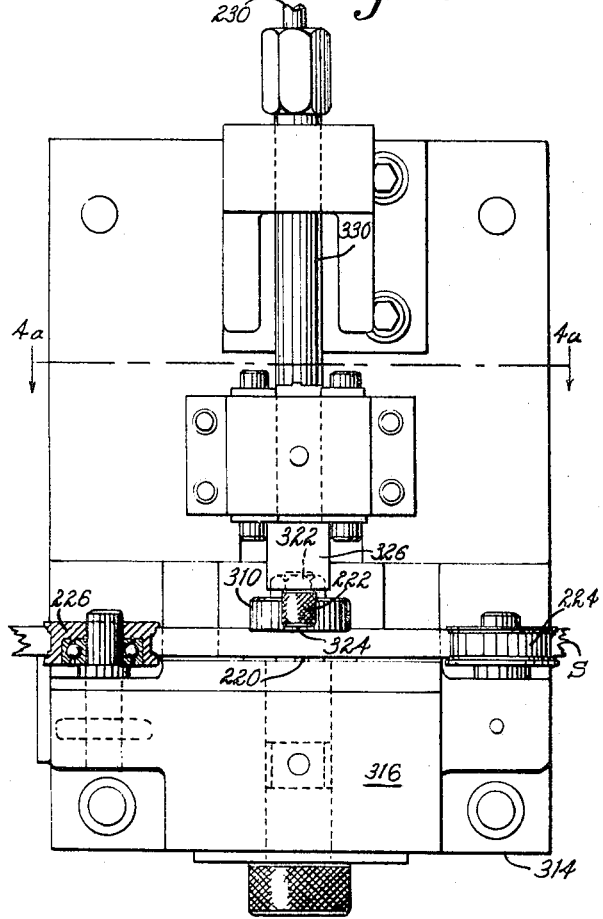
Figure 5A:
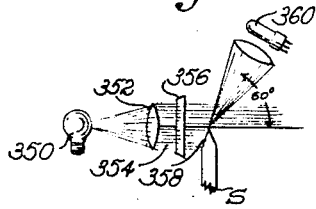
Figure 8A:
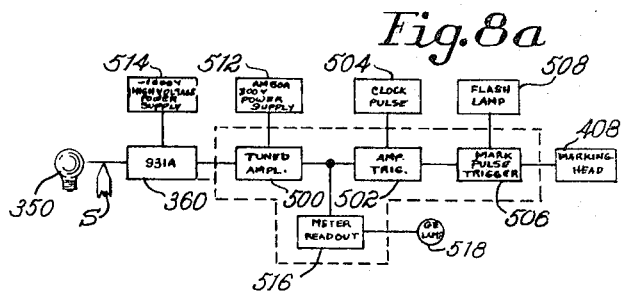
Figure 5B:
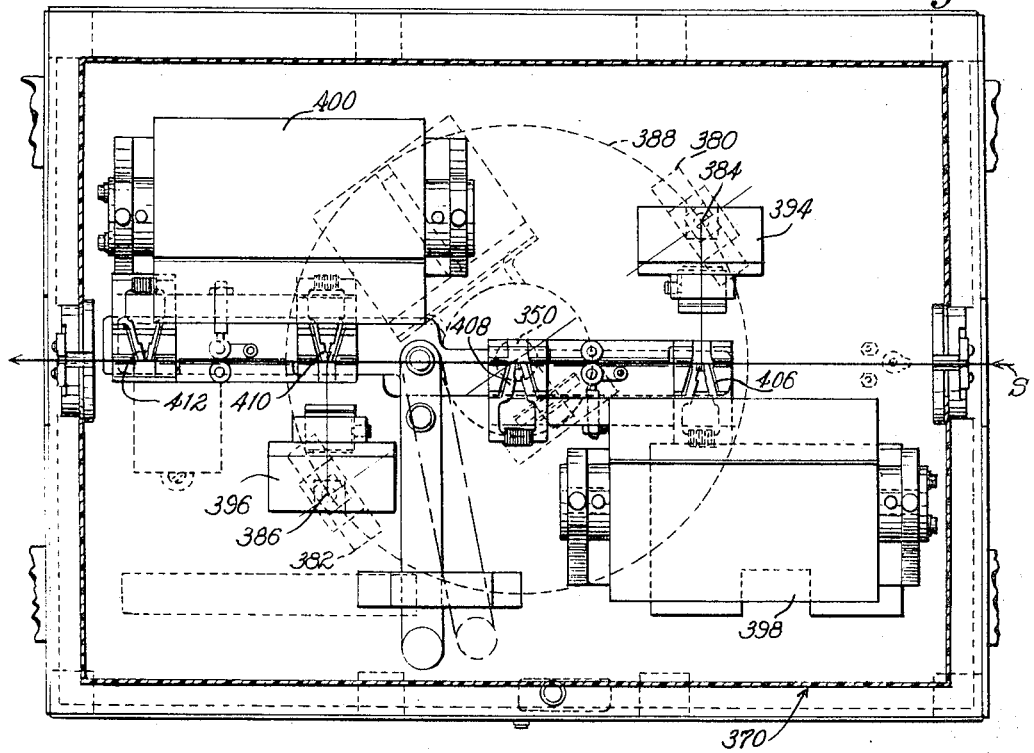
Figure 9:
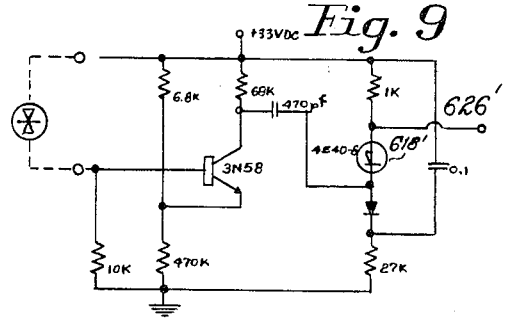
Figure 6:
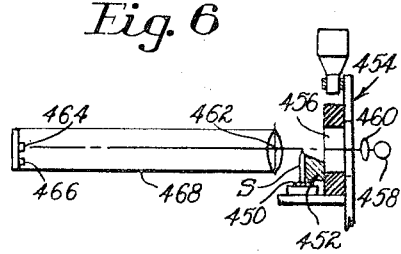
Figure 7A:
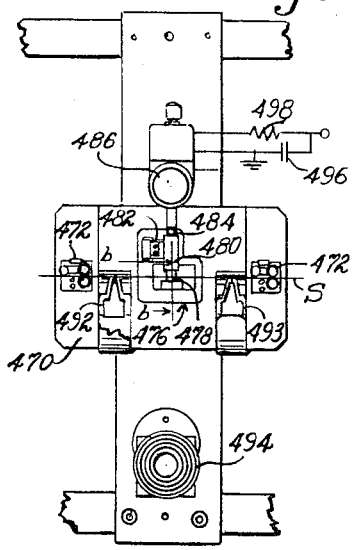
Figure 7B:
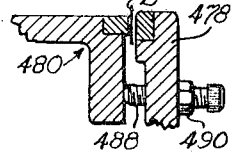

FIGS. 3*a, b, c,* and *d* are a series of views of the distortion gauging structure employed in the instrumentation system shown in FIG. 2, FIGS. 3*c* and 3*d* being sectional views taken along the line *c—c* and *d—d* respectively of FIG. 3*a*;

FIGS. 4*a, b,* and *c* are a series of views of the with gauging structure employed in the instrumentation system shown in FIG. 2, FIG. 4*b* showing portions of the structure removed for clarity;

FIG. 5*a* is a diagrammatic view of scanning apparatus employed in the inspection of sharpened edge of the blade during the sharpening and final inspection operations; and FIGS. 5*b* and *c* are top and side views respectively of that apparatus;

FIG. 6 is a schematic diagram of the width gauge structure employed in the inspection of the sharpened blade;

FIG. 7*a* is a schematic diagram of the weld detector employed at the final inspection station; and FIG. 7*b* is a sectional diagram of a portion of the weld detector taken along the line *b—b* of FIG. 7*a*;

FIG. 8*a* is a block diagram of circuitry for energizing a marking head; and FIGS. 8*b–f* are a series of schematic diagrams of circuits included in that circuitry;

FIG. 9 is a schematic diagram of a modified form of clock pulse source; and

Figure 10:
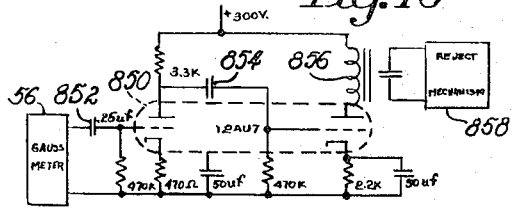

FIG. 10 is a schematic diagram of the electrical circuit arrangement responsive to a gauss meter which operates a reject mechanism.

Figure 1:
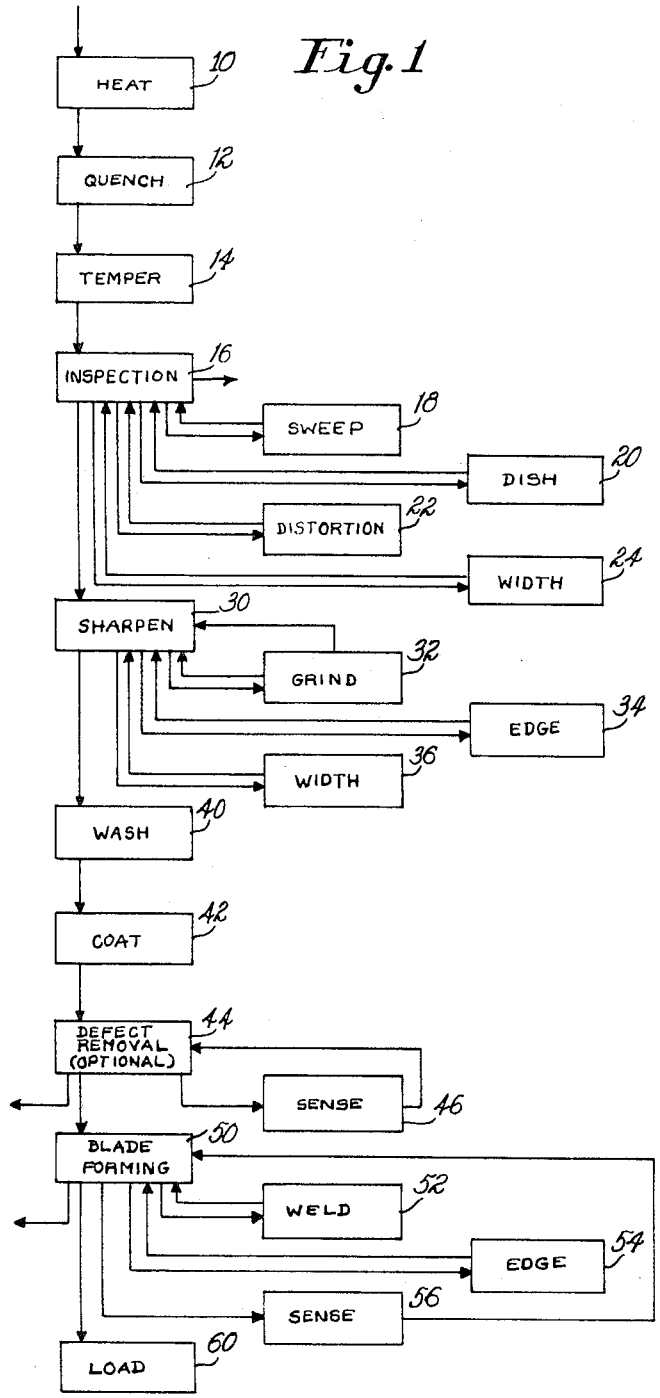
FIG. 1 is a block diagram of a production system for the processing of razor blades which employs process control methods and apparatus of the invention.

Indicated diagrammatically in FIG. 1 is a system for processing strip steel to form a razor blade of the ribbon type suitable for use in a razor magazine of the type shown in Patent No. 3,262,198. This strip steel, in this embodiment, is a stainless steel, the principal metallurgical constituents of which, in addition to iron are 0.40% carbon and 13.5% chromium. The steel strip has a width as sharpened, of 0.19 inch and a thickness of 0.0015 inch. In the processing of this steel strip, the strip, after slitting to the desired width, is passed through a furnace 10 at a rate of twenty-eight feet per minute, to heat the strip to a temperature in the order of 2000° F. through a quench assembly 12 in which the steel strip is rapidly cooled to a temperature of −90° F. and then passed through a tempering oven 14 which is maintained at approximately 600° F. to relieve stresses may have been placed in the steel by the heating and quenching operation in the hardening process. The continually moving strip is then passed through an inspection station 16 at which the hardened strip is sensed for sweep (curvature in its plane) by unit 18; dish characteristics, (curvature out of its plane) by unit 20; distortion such as burrs etc. by unit 22; and width variations by unit 24. The inspection station 16 produces outputs which may be utilized to control the transfer of the strip through the hardening process and also, where defects in excess of products limits are detected, are utilized to mark the steel strip magnetically to identify the location of such defects. The strip is then passed through a sharpening unit 30 in which the strip is subjected to a sequence of three abrading operations, a grinding operation, a rough honing operation, and a finish honing operation in which one edge of the strip is sharpened to a high-quality shaving edge. During the sharpening operation, the configuration of the facets formed by the abrading operations are sensed by unit 32; and the quality of the edge and the width of the blade after sharpening are also sensed by units 34 and 36 respectively.

After sharpening the blade is subjected to a washing operation by unit 40. A shaving facilitating coating is then adhered to the sharpened edge of the blade by unit 42.

After the blade is coated, it is inspected at station 44 by means of a gauss meter indicated diagrammatically at 46 and where a substantial length of defective steel is detected, that length is removed from the strip, the strip being welded to reform a continuous length. After this inspection strip is passed to a forming station 50 in which the long length of steel is separated into individual blade elements. At the forming station the strip is sensed for welds by unit 52 and magnetic marks are placed on the strip to indicate the present location of welds, the quality of the edge is again inspected by unit 54; and the location of defects is indicated by magnetic marks is sensed by gauss meter 56. Any strip with a defect mark on it is discarded and the other strips are formed as lengths are transported to a loading station 60 at which the strips are loaded into a magazine of the type shown in the above-mentioned Patent No. 3,262,198 by apparatus disclosed in the co-pending application Ser. No. 586,840, filed Oct. 14, 1966 in the name of Richard J. Maguire.

While this process control system is amenable to a continual processing from hardening unit 10 to the loading of the satisfactory blades into the cartridges at station 60, it has been found useful from a standpoint of manufacturing convenience to separate aspects of the processing into segments so that those segments may be individually controlled and operated at different speeds. Also, modified types of processing techniques as optimally required may be used. A first segment is the hardening segment which includes furnace 10 through inspection station 16. In this segment the steel strip is transported continuously at a rate of twenty-eight feet per minute and wound on a reel in a five thousand foot length. That reel is then transferred to the sharpening segment and the steel is transported through the sharpening apparatus 30 at a speed of forty feet per minute and the sharpening steel is wound on a second reel. A separate washing operation is employed at unit 40 through which the steel is transferred at a rate of one hundred feet per minute. The steel strip in coil form is then sprayed and with a telomer material placed in a cassette for the sintering treatment. After sintering, the steel is unwound at station 44 for inspection, and wound again in a coil. Further details of these processing steps may be had with reference to co-pending patent application Ser. No. 586,872, filed Oct. 14, 1966 in the name of Warren I. Nissen. Finally the coil is transferred to the forming station 50 at which the blade elements are formed and loaded into trays for transport to the loading station 60.

Additional details of the gauging units at the inspection station 16 are shown in FIG. 2. The strip S is pulled through the inspection station 16 by means of a pair of pull-out rolls 62, 64 which are driven through gear reducer 66 by a pull-out motor 68. That pull-out motor is controlled in speed by the control unit 70 which responds to two photocells 72, 74 in dancer roll unit 76. The relative conductivity of those photocells is controlled by the position of a dancer roll 78 which has secured to it a mask 80 of configuration as indicated in FIG. 2. Two light sources 82, 84 fixed in position, illuminate cells 72, 74 respectively as a function of the position of mask 78 and cells 72, 74 modify control unit 70 to adjust the speed of pull-out motor 68 to maintain the dancer roll 78 at a predetermined position and thus maintained a constant tension on the strip S as it is fed through the metallurgical treatment sequence and the inspection station 16.

Four gauging stations, as above indicated, sense parameters of the hardened steel strip. Sweep gauge 18 employs a gimbeled roller 90 having a slitted mask 92 attached to it, which mask controls the position of a beam of light from source 94 falling on a photopotentiometer 96. The output of that photopotentiometer is applied to a process control meter 98 and a product control meter 100. Meter 98, when the sweep condition of the steel reaches pre-established process limits, will produce an output to illuminate signal lamps 102 as an indication to the supervising personnel that the system is producing inferior strip although still within the product tolerances. Should the sweep defect become greater, the product meter 100 will cause a signal source 110 to produce an output which is applied to a time delay circuit 112 and to memory circuit 114. That memory circuit 114 has an input from a clock pulse source 116 which produces periodic output pulses as a direct function of the movement of the strip by the pull-out rolls as applied from a sequencing apparatus 118 (cams or other suitable devices) directly coupled to gear reducer 66. The clock pulse gates the defect signal from memory 114 and triggers marking circuit 120 to energize a magnetic marking head 122, a flash lamp 124, and to step a counter 126. Alarm lamps 128 on control panel are also lighted to indicate the condition of the sweep operation. Further details of the sweep gauging unit 18 may be had with reference to copending patent application Ser. No. 586,852 filed Oct. 14, 1966 in the name of Henry Behrens.

A second gauging instrument is the dish gauge unit 20 which senses for curvature of the strip in the transverse direction, this dish gauge being set to detect curvature from a flat reference plane of 0.0007 inch over a width of 0.180 inch. The apparatus includes a support structure 140 which includes two parallel spaced rails 142, 144 and an inlet for an air gauging jet 146 that is located centrally between the rails 142, 144. A hold-down shoe 148 is mounted in an air bearing structure 150 above the support structure and includes two corresponding rails 152, 154 which are aligned with rails 142, 144. Pressure is supplied to air bearing 150 by source 156 so that the main force exerted by the hold-down shoe 150 on the strip S is that of gravity. The back pressure in line 158, which varies as a function of the spacing of the surface of strip S from the orifice of the gauging jet 146, is sensed by a capsule 160 which controls the motion of core 162 of a differential transformer 164. The output of the differential transformer operates a meter 166 which provides a signal, when the dish condition exceeds predetermined limits, to operate relays 168 and store a defect signal in memory 170. Signals from relay 168 also actuate time delay unit 172 and control lamps 174.

A clock pulse from pulse generator 116 reads out the defect signal stored in memory 170 to operate trigger marking circuit 176. The output of circuit 176 operates a magnetic marking head of 178 similar to head 122, a flash lamp 180 and steps a counter 182. The nature of the dish condition (concave upwardly, concave downwardly or normal) is indicated by indicator lamps 174 respectively on the control panel. Further details of dish gauge 20 may be had with reference to co-pending patent application Ser. No. 586,874 filed Oct. 14, 1966 in the name of Joseph Markey.

The distortion gauge 22 includes a base 190 and an upper block 192. A support member 194 insulated from base 190 has its upper surface spaced 0.003 inch from the juxtaposed lower surface of block 192. An air curtain supplied by conduit 196 holds the strip S in contact with the surface of support 194 at the gauging station. Should a dent or burr exist in the strip, an electrical circuit will be completed between members 192 and 194 by strip S and an output signal will be produced which will operate relay 198 to store a defect signal in memory 200. The next pulse from generator 116 transfers that defect to delay memory 202 and then a signal for the delay pulse generator 204 gates the defect signal from memory 202 through trigger circuit 206 to energize two marking heads 208, 210 spaced four inches apart, a flash lamp 212 and step counter 214. A lamp on control panel 216 is also lighted and a defect signal is stored in time delay unit 218. Additional details of this distortion gauge and typical magnetic marking heads may be seen with reference to FIG. 3.

The fourth inspection station in the hardening instrumentation is the width gauge 24 which includes a reference contact 220 which is maintained in engagement with one side of strip S and a floating contact 222 which engages the other side of strip S and moves as a function of its width. Guides 224, 226 provide lateral positioning for strip S. An air gauging unit 228 connected to line 230 senses the back pressure in that line and controls a relay 232, which relay, when strip width exceeds predetermined limits applies a signal to memory 234 which reject signal is read out by clock pulse generator 116 to energize marker trigger circuit 236 and marker head 238, flash lamp 240 and counter 242 in similar manner to the instrumentation described above in connection with stages 18, 20 and 22.

Also connected to each set of relays 110, 168, 198 and 232 is a time delay unit (112, 172, 218, 246) having a contact which closes after the relay is maintained is energized for a predetermined period of time, a typical value being thirty seconds. Upon closing of a time delay relay contact a wind-up reel lockout relay 248 is energized to de-energize the wind-up reel motor 250 and to release the air pressure on the upper gauge pull-out roll 64 so that the strip will not be advanced through the gauging instrumentation. Interlocks also are employed to control motor 250 such as air pressure switch 252 at distortion detector unit 22. An override switch 254 is employed which enables the gauging control to be bypassed and the wind-up reel motor 250 to be operated independently of the output of the gauging instrumentation. This switch is useful in connection with start up operations for example and for maintenance where it is desired to operate the instrumentation system even though the strip being passed through the system has defects in it.

A typical example of the mounting and the configuration of magnetic marking heads relative to the strip path is indicated in FIG. 3 which illustrates the distortion gauge. In this gauge structure two marking heads 208, 210 are employed which place on the strip S two marks spaced four inches apart in a manner which bridges the defect. This arrangement is used as such defects may be localized and occur randomly, and it is essential to identify the location on the strip of the defects. In the case of defects sensed by other instrumentation a mark is placed by a single marking head in response to each sensed defect as gated out a clock pulse.

With reference to FIG. 3 the support block 190 is positioned to provide a guide surface for support of metal blade strip S for sensing at axis 251. Prior to the inspection station are disposed a pair of guide elements 253 and a pair of wiper pads 255 which remove any dust or other contaminants from the strip S that might interfere with the accurate measurement of distortion. Two inches beyond the gauging axis 251 is disposed a first marking head 208 at axis 256 and four inches from marking head axis 256 is located a second marking head 210 at axis 258. Both marking heads, in response to detection of a defect by gauge structure 22 place magnetic marks on the strip S simultaneously at a time when the sensed defect is located between the heads 208, 210.

Supported on base member 190 is a first terminal member 194 of configuration as indicated in FIGS. 3c and 3d which provides a fixed guide surface for the strip. The support member 190 has surfaces 260, 262 on either side of member 194. Biased against surfaces 260, 262 is a second terminal member 192 so that a space between terminal members 192 and 194 of 0.003 inch is defined. Terminal member 192 is biased down against support surfaces 260, 262 by springs 264. Member 192 has an air passage 266 which extends downwardly through it and terminates in a laterally extending passage 268. End caps 270, 272, secured on either side of terminal 192, each includes a slot 274 0.150 inch in depth through which air is directed downwardly onto the strip S in a curtain which holds that strip in contact with the surface of terminal member 194 as that strip as passes over that terminal member. Should strip S have a defect such as a dent in it so that the strip simultaneously contacts terminals 192 and 194, a circuit is completed between lines 276, 278 to operate relay 198 (FIG. 2). That defect signal is stored in memory 200, transferred to delay memory 202 in response to the next clock pulse from generator 116, and then read out of memory 202 by a pulse from generator 204 which is timed to occur two inches of strip travel later than the clock pulse signal from generator 116. Thus if a clock pulse signal occurs substantially simultaneously with the detection of the defect at stage 22, the marking heads 208, 210 will place marks on the strip when the defect is just about aligned with head 208. Should a defect be detected just after the generation of a clock pulse, the marking heads will be energized in response to the second delay pulse when the defect is approximately aligned with head 210.

Each marker head employed in this system has a pole piece 290 of configuration as indicated in FIG. 3 which manufactured of pure soft ingot Armco iron (three points carbon maximum) and has a brass insert 292, 0.062 inch in width, disposed between the opposed ends 294, 296 of the core which define a gap in the magnetic circuit of ⅛ inch square cross-section. Coil 298 is mounted on pole piece rear leg 300 and is formed of one hundred turns of No. 28 Nyclad wire disposed in two equal layers of fifty turns each. Each pole piece 290 is secured to support 302 by bolts 304 so that marking head insert 292 is aligned with and immediately above the path of strip S over support 306. Terminal block 308 enables connections to be made to the marking head control circuit 206 and to relay 198.

Figure 4C:
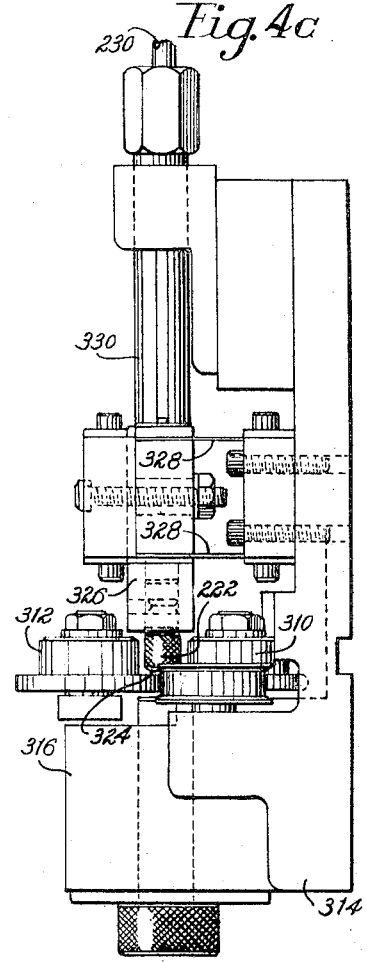

With reference to FIGS. 4a–c, the strip S passes between two rolls 310, 312 as guided by input and output guide rollers 224, 226 respectively. Roll 310 is mounted for free rotation on base 314 and roll 312 is mounted for free rotation on arm 316 pivotally mounted on base 314 and biased by spring 318 towards juxtaposed contact with roll 310. Strip S is interposed between roll 310 and 312 at the gauging station. At that station, one edge of the strip is supported on a reference rail 220. On the upper side of the blade path as viewed in FIGS. 4b and c is provided a gauge block 222 having a contact surface 324 disposed for contact with the opposite side of the strip from reference surface 220. Block is mounted on a support plate 326 that in turn is supported from base 314 by a set of four flat springs 328 disposed in a pantograph configuration. A gauging nozzle system 330 is mounted above gauge block 322 and senses the movement of block surface 324 relative to the nozzle of the gauging system through sensing back pressure in line 230 connected to nozzle assembly 330 and thus provide an indication of strip width as block 222 moves as a direct function of the width of strip S.

Figure 5C:
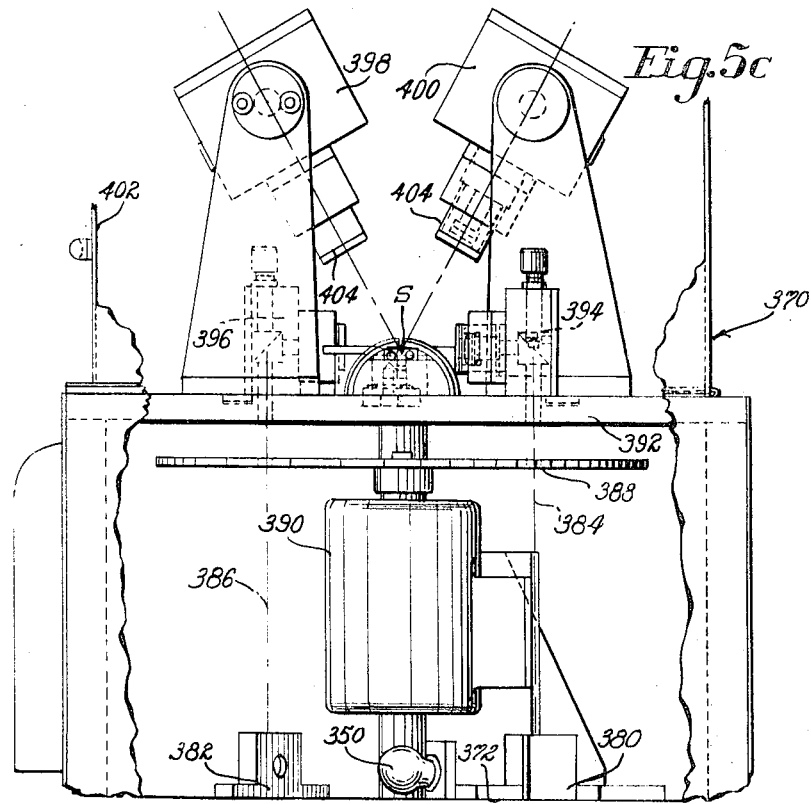

Instrumentation employed in the sharpening line include apparatus 32 for the automatic control of the grinding operation of the type shown in the Patent No. 3,238,675; blade facet scanner apparatus 34 of the type shown in FIGS. 5a–c; and a final width gauge 36 of the type shown diagrammatically in FIG. 6.

A diagrammatic indication of the blade facet scanner unit 34 is shown in FIG. 5a. This scanner unit employs a light source 350 whose output is collimated by lens 352 to provide a parallel beam rays 354 which are passed through a mask 356 to impinge on the facet 358 of the blade strip S. A photomultiplier sensor 360 disposed at an angle of 60° with respect to the collimated beam 354 senses light scattered from the facet 358 and the output of the photomultiplier 360 is utilized as an indication of the quality of the honed facet. As the included half angle at the ultimate tip of the blade in this embodiment has a value in the order of 28° only scattered light (no reflected light) should be sensed by photomultiplier 360 if the blade is optimally sharpened. Two similar sensing units are employed at station 34, one sensing unit being arranged to sense the quality of one facet and the other sensing unit being spaced eight inches along the direction of travel of the strip S from the first unit for sensing the quality of the opposite facet.

With reference to the detailed views of the structure shown in FIGS. 5b and c, a 6.3 volt prefocused lamp 350 is mounted on the lower base plate 372 of the Y-beam scanner housing 370 and is energized from a 6.0 volt constant voltage transformer also mounted on base plate 372. Light from source 350 passes through plane-convex focusing lens and impinges on two right angle prisms 380, 382 which direct the light upwardly along paths 384, 386 on either side of the strip S. Paths 384, 386 are separated by a distance of eight inches along the direction of strip movement. A disc mask 388 having fifty equally spaced apertures disposed about its periphery is driven by a synchronous motor 390 at 1800 r.p.m. The disc chops the light in paths 384, 386 and produces a 1500 cycle per second light signal. The light then passes through apertures in the upper base plate 392 and into lens housings 394, 396 for projection onto either side of the blade strip S. Each lens housing contains an optical system including a prism for deflecting a beam to a horizontal path, a masking slit and two convex lenses, which system is adjusted to produce a projected light rectangle 0.020 inch wide by 0.125 inch high on the blade edge located so that the ultimate tip of the blade horizontally bisects the light rectangle.

Photomultiplier sensor units 398, 400, each including a type 931 photomultiplier tube 360, are mounted in superstructure 402. Each unit includes a lens unit 404 arranged to view an area 5/32 inch in diameter on the illuminated edge of strip S along a path inclined at 60° to path of the impinging beam. The output signal from each photomultiplier tube 360 is amplified to provide a signal suitable for operating the pair of associated marking heads 406, 408 and 410, 412. That circuitry for generating that signal described subsequently in connection with FIGS. 8a–f.

Details of unit 36 for sensing the width of the sharpened blade are indicated in FIG. 6. Blade S is moved through inspection station 36 on a diamond reference surface 450.

The blade body is positioned vertically by support member 452 and the horizontal and vertical supports are mounted on a micrometer adjustment stage 454 for movement as a unit vertically. Micrometer stage 454 has an aperture 456 in it and disposed behind that aperture is a light source 458 and a collimating lens 460 which forms light from the lamp 458 into a beam of parallel rays. Disposed on the opposite side of blade S is a tube 468 in which an objective lens 462 and two photovoltaic sensing cells, a measuring cell 464 and a reference cell 466 are housed. Micrometer stage 454 is adjusted so that the edge of a blade S of standard width is aligned with measuring cell 464 which is disposed on the center line of the optical system. In operation reference cell 466 is normally fully exposed to light from lamp 458 while only half of measuring cell 464 is exposed to light. The difference between the outputs of the measuring cell 464 and referece cell 466 is sensed and applied to a zero center read-out meter, which meter closes a contact whenever the width of the blade exceeds pre-established tolerance deviation from the standard sharpened width of 0.19 inch to produce an output signal which actuates a magnetic marking head and places on the strip S an indication of the detected width defect at this stage.

A top view of weld detector 52 is shown in FIG. 7a and an enlarged sectional view of a portion of that detector is shown in FIG. 7b. The weld detector includes a base 470 on which are mounted two pairs of guide rollers 472 and 474 which guide the strip S past a gauging station 476 that includes a fixed reference surface 478 and a movable reference member 480 which is supported by a resilient pantograph structure 482. Gauging member 480 has end 484 opposite strip S, the position of which is sensed by dial indicator 486.

Secured to fixed reference 478, as indicated in FIG. 7b, is a stop structure 488 which is secured in place by lock nut 490. This stop structure is adjusted to provide a gap between reference 478 and movable refenence shoe 480 of 0.0016 inch so that this gauging structure will normally impose no frictional resistance to the movement of strip S past the gauging station.

An output circuit connected to indicator 486 provides an output pulse should thickness of strip S exceed 0.0019 inch and that output signal will energize marking heads 492 and 493 to apply magnetic marks to the blade strip so that those marks are disposed on either side of the detected excess width of strip S and to energize flash lamp 494. The output from sensor 486 closes contacts (not shown) to permit discharge of capacitor 496 through resistor 498 and apply a pulse to the input terminal of a trigger circuit 506 (similar to the signal applied by test switch 670 to transistor 652—FIG. 8e) to generate an output pulse which energizes marking heads 492 and 493 and flash lamp 494.

ELECTRONIC CIRCUITRY

The electronic circuitry for converting an output signal from the photomultiplier 360 of scanner 34 to operate the magnetic marking heads 406, 408 or 410, 412 is indicated in FIG. 8a. That circuit is similar to other circuit arrangements employed in this apparatus for placing defect marks on strip S, and it will be understood that the other gauging stations operate similar circuit arrangements. That circuitry includes a tuned amplifier 500, a trigger circuit 502 which is gated by signals from clock source 504, a trigger amplifier circuit 506 which energizes a marking head 408 and a flash lamp 508. Amplifier 500 is energized by a 300 volt power supply 512 and photocell 360 is energized by 1000 volt power supply 514. The signal from amplifier 500, in addition to setting trigger (storage) circuit 502, actuates meter 516 and lamp 518.

Figure 8B:
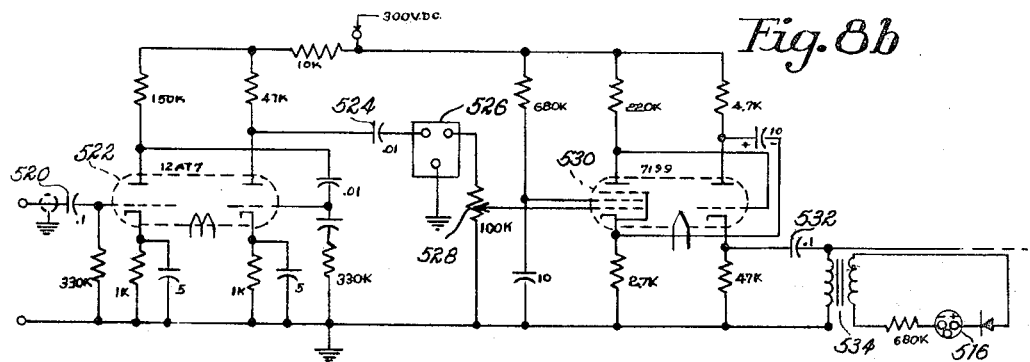

A schematic diagram of the tuned amplifier circuit 500 is shown in FIG. 8b. That amplifier has applied to it a 1500 cycle per second signal, the amplitude of which is a function of the magnitude of radiation impinging on photomultiplier 360. This signal from the photomultiplier is coupled by capacitor 520 to amplifier tube 522 connected to provide two stages of amplification. The output from that tube is coupled by capacitor 524 through a filter 526 tuned to 1500 cycles per second and having a band pass of 30 cycles (United Transformer Company "BMT 1500 Interstage Filter"). The output from filter 526 is applied through gain control potentiometer 528 to tube 530, the first stage of which is connected as an amplifier and the second stage of which is connected as a cathode follower to provide an output signal coupled by capacitor 532 to storage circuit 502 and, through transformer 534, to provide a signal to operate DC microameter 516 which provides an indication of the intensity of the output from the phototube 360. The meter is connected so that the normal current flowing in the secondary of transformer 534 in response to a razor edge of optimum quality is five microamperes but should the signal fall to one microampere, a low level contact will be closed, thus providing a fail-safe circuit arrangement which guards against failure of the lamp 350, the photomultiplier 360 or circuit components of the amplifier 500.

Figure 8C:
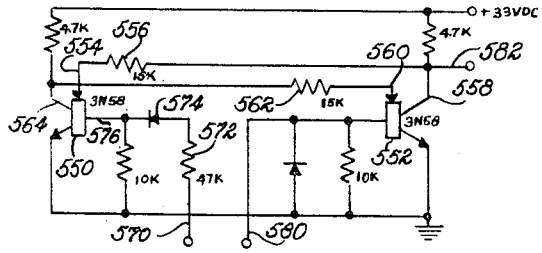

A schematic diagram of the amplitude trigger or storage circuit 502 is shown in FIG. 8c. That circuit is essentially a bistable multivibrator circuit which employs two silicon controlled switches 550 and 552. The injector electrode 554 of switch 550 is connected in a cross-coupling circuit by resistor 566 to the collector electrode 558 of switch 552; while the injector electrode 560 of switch 552 is connected through cross-coupling resistor 562 to collector 564 of switch 550. An input signal from amplifier 500 is applied over line 570 through resistor 572 and isolating diods 574 to the base electrode 576 of switch 550. When the peak to peak amplitude of the signal from amplifier 500 applied over line 570 exceeds twenty volts switch 550 is turned on. The potential on collector electrode 564 then goes to ground and that voltage transition is coupled by resistor 562 to injector electrode 560 to turn off switch 552.

Switch 552 is turned on in response to a clock pulse signal applied over line 580 which turns on switch 552, producing a negative voltage transition at collector electrode 558 which is applied on output line 582.

Figure 8D:
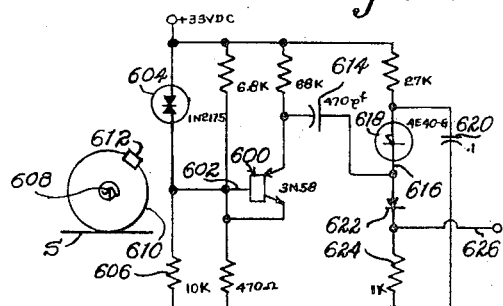

A schematic diagram of the clock pulse generator circuit 504 is shown in FIG. 8d. As illustrated in that FIGURE the circuit includes a transistor 600 which is turned on in response to an input signal produced when a pulse voltage transition is applied to the control electrode 602. In the embodiment shown in FIG. 8d a photodiode 604 is connected in voltage dividing relation with a resistor 606. As diagrammatically indicated in that figure, photodiode 604 is disposed to optically sense a light source 606 which is mounted within a cylinder 610 that has an aperture 612 in its circumferential wall. Cylinder 610 is driven by a strip S and once during each revolution of cylinder 610 aperture 612 is aligned between source 608 and photodiode 604 so that the impedance of that diode drops rapidly from five megohms to about fifty thousand ohms, producing a positive going voltage transition on control electrode 602. The circumference of cylinder 610 is four inches in length so that this voltage transition is produced in response to each four inches of strip advance. While this circuit uses a photodiode arrangement, other arrangements for coordinating the strip advance with the operation of the pulse generator circuit may also be employed, for example, use of cam switches directly mounted on a drive roll, in an arrangement indicated diagrammatically in FIG. 2 for example, so that the closing of each cam switch applies a positive going voltage transition to the control electrode either directly or through intermediate relay or other suitable transducer.

When transistor 600 is placed in conducting condition it produces a negative going transistor which is applied through capacitor 614 to anode 616 of Shockley diode 618. As capacitor 620 has been charged to supply potential (plus 33 volts) a voltage difference approximately 60 volts is impressed across diode 618 and that diode conducts an avalanche manner to complete a discharge circuit through diode 622 and resistor 624 to discharge capacitor 620. When the current flow-through diode 618 drops to eight milliamperes it stops conducting. This circuit produces a positive 33 volt spike 0.3 milliseconds in duration.

(A similar clock pulse generator circuit is shown in FIG. 9, the principal difference being that this pulse generator produces a negative clock pulse as the output line 626' is connected to the cathode of Shockley diode 618' and the transition, on conduction of diode 618', is a negative spike rather than a positive spike in the circuit arrangement shown in FIG. 8d.)

This output pulse is applied over line 580 (FIG. 8c) to turn-on switch 552 in an effective read-out operation should a defect signal have turned on switch 550 previously. In operation, switch 525 remains in conducting state until a signal of sufficient amplitude is applied to control electrode 576 of switch 550 to turn that switch on. As long as switch 550 is off, clock pulses applied over line 580 to switch 552 will have no significant effect on output line 582. The clock pulse signal applied on line 580 is sufficient to cause switch 552 to conduct even though switch 550 is conducting. Such conduction of switch 552 produces the negative output transition at line 582 in response to each clock pulse where a defect signal is present on line 570 or has been present since the previous clock pulse.

Figure 8E:
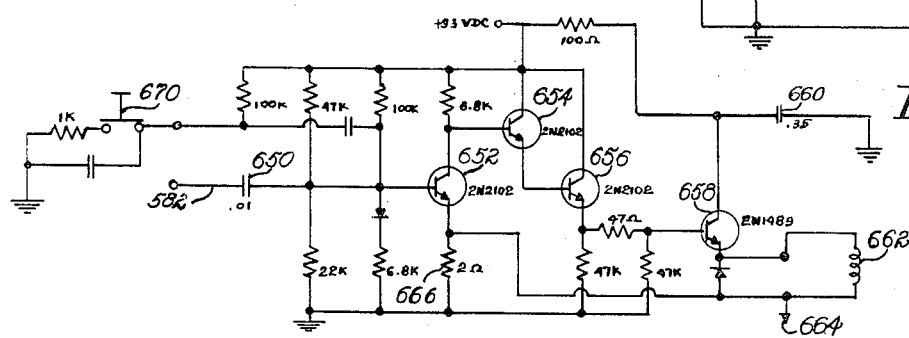

This negative transition (line 582) is applied to the trigger amplifier circuit 506, a schematic diagram of which is shown in FIG. 8e. The negative transition coupled by capacitor 650 turns off transistor 652 which transistor turns on the cascaded amplifier of transistors 654, 656 and 658. With the turn on of transistor 658 the charged capacitor 660 is discharged through the collector-emitter circuit of transistor 658, coil 662 of the marking head 408 and the resistor 664. (The flash lamp circuit is connected to terminal 664 and hence across resistor 666.) During conduction of transistor 658 a current of 4.5 amperes flows through the marking head winding 662 to impress on the strip S a magnetic mark in the order of 20 gauss intensity. (A test circuit connected to this pulse trigger circuit responds to push button 670 and applies a negative transition to the base of transistor 652 which may be used to test the operability of the associated flash lamp.)

Figure 8F:
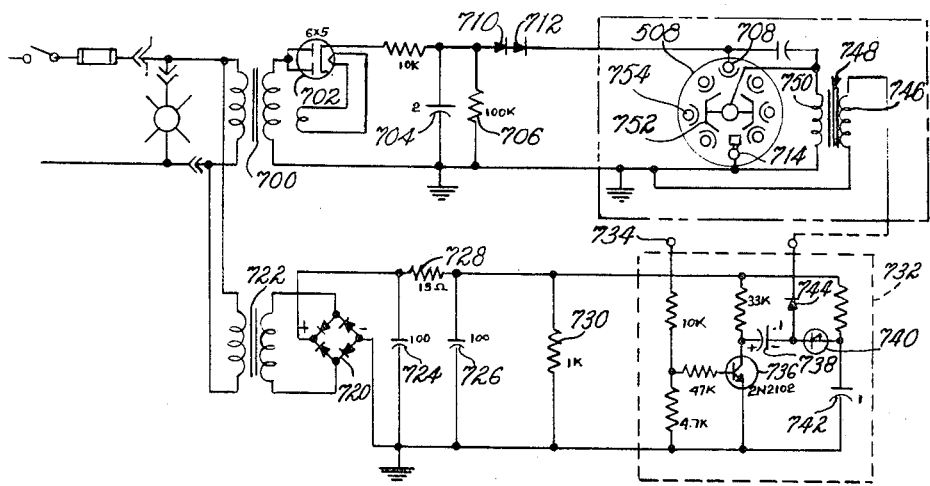

With reference to FIG. 8f, showing a schematic diagram of the flash lamp circuit 508, a 115 volt, sixty cycle signal is applied to transformer 700 which produces an output voltage for amplication to dual diode rectifier tube 702. The output of tube 702 charges capacitor 704 to a voltage of approximately 450 volts. Output resistor 706 is connected across capacitor 704. An output voltage capacitor 704 is applied to the anode 708 of Edgerton Model FX–6A zenon flash lamp 508. Diodes 710 and 712 provide isolation between the rectified circuit and the flash lamp. Cathode 714 of the flash lamp is connected to ground.

A bridge rectifier circuit 720, coupled to transformer 722, provides an output of thirty three volts. A filter circuit including capacitors 724 and 726 and resistors 728 and 730 provide a regulated 33 volt supply for ignitor control circuit 732. That control circuit has an input through terminal 734 from the marking head circuit terminal 664 (FIG. 8e) for application to the base electrode of transistor 736. Transistor 736 is normally nonconducting and capacitor 738 is charged as indicated to thirty three volts to the polarity indicated. A Shockley diode 740 is employed as a control device and when transistor 736 turns on in response to a positive eight volt transition via terminal 734, the potential difference across diode 740 causes it to break down, providing a discharge path for capacitor 742 through diode 744 to the primary 746 of ignitor transformer 748. This voltage transition produces an output voltage spike in the order of 1300 to 1700 volts to appear across the secondary 750 of transformer 748 for application via capacitors 752 to ignitor electrodes 754 of flash lamp 508. The discharge from the ignitor electrodes ionizes the gas within tube 508 sufficiently to cause break down from anode 708 to cathode 714 resulting in an arc supplied by capacitor 704 of a few microseconds in duration, which arc is extinguished when the voltage on capacitor 704 drops below the value required for sustaining the arc discharge. Thus each time a marking head is energized in response to a defect sensed by scanner 34 a flash lamp is also fired. Similar circuits respond to other defect signals to place magnetic marks on strip S and signal such defects by firing an associated flash lamp.

Magnetic marks on strip S are detected with a Hall Effect device mounted on the tip of an F. W. Bell Co. probe model YA-01-004 used in conjunction with a Model 1477R gaussmeter which provides a five volt output pulse for each sensed magnetic mark. In this embodiment the magnetic marks, as sensed by this gaussmeter after passing through a sintering process, have a strength in the order of ten to twelve gauss while the mark is initially applied to the strip has a strength in the order of twenty-five gauss. The sensing gaussmeter detects magnetic marks in a range of eight to twenty-five gauss. The output from gaussmeter 56 is applied to the circuit shown in FIG. 10 which employs a vacuum tube 850 to which the input pulse is coupled by capacitor 852. The signal is applied to the first stage of dual triode 850 and coupled by capacitor 854 to the second stage for energizing plate relay coil 856 to operate a reject mechanism 858 automatically remove a strip segment having a defect mark in it from the processing system. Further details of a reject mechanism used in this razor blade processing system may be had with reference to co-pending patent application Ser. No. 586,713 filed Oct. 14, 1966 in the name of Frank S. Martin.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. Process control apparatus comprising a gauging station for sensing a parameter of a metal element of indeterminate length in a continuous process, said gauging station producing an output in the sensing of a predetermined value of the sensed parameter,
    a signal source coordinated with the movement of the metal element past said gauging station for producing gating signals at regular intervals,
    a magnetic marking head positioned adjacent the path of said metal element for generating a magnetic field of sufficient density to place a detectable magnetic spot on said metal element,
    control responsive to the concurrent generation of a gauging station output and a gating signal for energizing said marking head to apply a magnetic mark to said metal element, and
    a magnetic sensor for sensing said marks and controlling the further processing of said metal element in response to the output of said magnetic sensor.

2. The apparatus as claimed in claim 1 and further including a second gauging station for sensing a second parameter of said metal element, said second gauging station producing a second output on the sensing of a predetermined value of said second parameter,
    and said control responds to the concurrent generation of an output of said second gauging station and a gating signal for energizing a magnetic marking head to apply a detectable magnetic mark to said metal element.

3. The apparatus as claimed in claim 2 wherein each said gauging station has a magnetic marking head associated with it.

4. The apparatus as claimed in claim 3 wherein at least one gauging station has two associated magnetic marking heads spaced along the path of movement of said metal element,
    and further including means to delay said gating signal and then to apply said delayed gating signal to energize said two associated heads simultaneously to apply two spaced magnetic marks to said metal element.

5. The apparatus as claimed in claim 1 wherein said magnetic sensor is a gaussmeter that includes a Hall effect device.

6. Razor blade process control apparatus comprising a gauging station for sensing a parameter of a metal razor blade strip of substantial length during a continuous process of treatment of said strip, said gauging station producing an output on the sensing of a predetermined value of the sensed parameter,
    a signal source responsive to movement of the metal strip past said gauging station for producing gating signals at regular intervals,
    a magnetic marking head positioned adjacent the path of said metal strip for generating a magnetic field of sufficient density to place a detectable magnetic spot on said metal strip,
    control responsive to the concurrent generation of a gauging station output and a gating signal for energizing said marking head to apply a magnetic mark to said metal strip, and
    a magnetic sensor for sensing said marks and controlling the further processing of said metal strip in response to the output of said magnetic sensor.

7. The apparatus as claimed in claim 6 wherein said metal strip is an alloy steel and said marking head includes an iron pole piece having a nonferrous insert disposed in a gap in said pole piece, said gap being disposed immediately adjacent the path of said strip and wherein said control energizes said marking head to generate a magnetic mark of at least ten gauss intensity.

8. The apparatus as claimed in claim 7 wherein said magnetic sensor is a gaussmeter that includes a Hall effect device.

9. The apparatus as claimed in claim 6 wherein said gauging station senses the quality of a sharpened edge of said metal strip.

10. The apparatus as claimed in claim 9 wherein said gauging station includes structure defining a strip path,
    a light source and optical structure for forming two light beams for impingement on the sharpened edge of said strip in a direction normal to said strip from opposite sides thereof,
    and two light sensors, each disposed to sense only light scattered from a defectively sharpened edge in response to the corresponding light beam and generating an output in response to such scattered light,
    and wherein a set of two said magnetic marking heads are associated with each light sensor for energization in response to a gating signal generated after the associated light sensor produces an output,
    the marking heads in each set being spaced along said strip path a distance corresponding to the repetition rate of said gating signals.

11. The apparatus as claimed in claim 10 wherein each said light sensor is a photomultiplier device.

12. The apparatus as claimed in claim 6 wherein said control includes a storage circuit for storing said gauging station outputs and application of a gating signal to said storage circuit while a gauging signal is stored therein produces a storage circuit output to energize said marking head.

13. The apparatus as claimed in claim 12 wherein said storage circuit is a bistable multivibrator.

14. The apparatus as claimed in claim 6 and further including an indicator responsive to energization of said magnetic marking head for providing a concurrent indication of energization of said marking head.

15. The apparatus as claimed in claim 14 wherein said indicator is a gas filled flash lamp.

16. The apparatus as claimed in claim 9 and further including a plurality of gauging stations for sensing width, thickness, and curvature parameters of said metal strip after it has been subjected to a hardening process, each of said gauging stations including at least one magnetic marking head for placing a detectable magnetic mark on said metal strip in response to said gating signal whenever a predetermined value of the parameter to which it is responsive is sensed, and wherein said magnetic sensor sensed all the marks placed on said strip by said plurality of gauging stations.

17. The apparatus as claimed in claim 16 wherein said magnetic sensor is a gaussmeter that includes a Hall effect device.

18. The apparatus as claimed in claim 17 wherein said metal strip is an alloy steel and said marking head includes an iron pole piece having a nonferrous insert disposed in a gap in said pole piece, said gap being disposed immediately adjacent the path of said strip and wherein said control energizes each said marking head to generate a magnetic mark of at least twenty gauss intensity.

19. The method of processing a metal strip of indeterminate length in a continuous processing system comprising the steps of subjecting said strip to a hardening process, subjecting the hardened strip to a first inspection, placing a magnetic mark on said strip to identify each defective portion of the hardened strip detected as a result of said first inspection, mechanically working said hardened strip, subjecting said mechanically worked strip to a second inspection, placing a magnetic mark on said strip to identify each defective portion detected as a result of said second inspection, and sensing the magnetic marks on said strip to control the processing of said strip.

20. The method as claimed in claim 19 and further including the step of coordinating the placing of magnetic marks on said strip so that said marks are located only at predetermined spaced positions on said strip.

21. The method of processing razor blades comprising the steps of subjecting a strip of razor blade metal to a hardening process, subjecting the hardened razor blade strip to a first inspection, placing a magnetic mark on said razor blade strip to identify each defective portion of the hardened strip detected as a result of said first inspection, sharpening an edge of said razor blade strip to a shaving edge, subjecting the shaving edge of said razor blade strip to a second inspection, placing a magnetic mark on said razor blade strip to identify each defective shaving edge portion detected as a result of said second inspection, applying a shave facilitating coating on said shaving edge, heating said razor blade strip to secure said coating to said shaving edge, separating said razor blade strip into blade elements, and sensing the magnetic marks on said razor blade strip to control the processing of said blade elements.

22. The method as claimed in claim 21 and further including the step of coordinating the placing of magnetic marks on said strip so that said marks are located only at predetermined spaced positions on said strip.

23. The method as claimed in claim 22 wherein each said mark as placed on said blade strip has an intensity of at least twenty gauss.

References Cited

UNITED STATES PATENTS

| | | | |
|---|---|---|---|
| 1,887,504 | 11/1932 | Frost | 148—16 |
| 1,942,025 | 1/1934 | Frost | 74—104 X |
| 2,929,136 | 3/1960 | Andren | 29—417 |
| 3,279,283 | 10/1966 | Craig | 76—104 |
| 3,357,087 | 12/1967 | Barnikel et al. | 29—407 |

THOMAS H. EAGER, *Primary Examiner.*

U.S. Cl. X.R.

29—417, 33; 76—104; 148—12.4, 128